(12) United States Patent
Jeon et al.

(10) Patent No.: US 9,667,953 B2
(45) Date of Patent: May 30, 2017

(54) DISPLAY DEVICE

(71) Applicant: LG CHEM, LTD., Seoul (KR)

(72) Inventors: Byoung Kun Jeon, Daejeon (KR); Su Young Ryu, Daejeon (KR); Moon Soo Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 14/527,454

(22) Filed: Oct. 29, 2014

(65) Prior Publication Data

US 2015/0049175 A1 Feb. 19, 2015

Related U.S. Application Data

(63) Continuation of application No. PCT/KR2013/011044, filed on Nov. 29, 2013.

(30) Foreign Application Priority Data

Nov. 29, 2012 (KR) .................... 10-2012-0137400
Nov. 29, 2013 (KR) .................... 10-2013-0147933

(51) Int. Cl.
*H04N 13/04* (2006.01)
*G02B 27/26* (2006.01)

(52) U.S. Cl.
CPC ......... *H04N 13/0434* (2013.01); *G02B 27/26* (2013.01)

(58) Field of Classification Search
CPC . H04N 13/0429; H04N 13/0434; H04N 13/04

USPC .......................................................... 348/57
See application file for complete search history.

(56) References Cited

U.S. PATENT DOCUMENTS

| | | | |
|---|---|---|---|
| 2006/0290854 A1 | 12/2006 | Hisatake | |
| 2007/0056682 A1* | 3/2007 | Yamada et al. | 156/249 |
| 2007/0165308 A1* | 7/2007 | Wang et al. | 359/494 |
| 2009/0251650 A1* | 10/2009 | Fukagawa et al. | 349/119 |
| 2010/0302634 A1* | 12/2010 | Jung | 359/465 |
| 2012/0044431 A1* | 2/2012 | Osterman | G02F 1/13471 349/15 |
| 2012/0249900 A1* | 10/2012 | Koike | G02F 1/133528 349/15 |
| 2013/0321247 A1* | 12/2013 | Ajichi | 345/55 |
| 2014/0133025 A1* | 5/2014 | Lee | G02B 27/2214 359/465 |

FOREIGN PATENT DOCUMENTS

| | | |
|---|---|---|
| CN | 1777834 A | 5/2006 |
| CN | 1932560 A | 3/2007 |
| CN | 101900890 A | 12/2010 |
| CN | 102789064 A | 11/2012 |
| JP | 2004-226945 A | 8/2004 |

(Continued)

*Primary Examiner* — Tung Vo
*Assistant Examiner* — Zaihan Jiang
(74) *Attorney, Agent, or Firm* — Dentons US LLP

(57) ABSTRACT

Provided are a display device and polarizing glasses. The display device allows a user to wear polarizing glasses including a positive or negative uniaxial retardation layer and observe stereoscopic images. The display device includes a uniaxial retardation layer with the opposite sign to the uniaxial retardation layer included in the polarizing glasses so that the display device can have highly improved upper, lower, left, and right viewing angles.

21 Claims, 13 Drawing Sheets

(56) References Cited

FOREIGN PATENT DOCUMENTS

| | | | |
|---|---|---|---|
| JP | 3602065 | B2 | 12/2004 |
| JP | 2011158574 | A | 8/2011 |
| JP | 2012-018396 | A | 1/2012 |
| JP | 2012022148 | A | 2/2012 |
| JP | 2012-123040 | A | 6/2012 |
| JP | 2012-212033 | A | 11/2012 |
| JP | 2013122584 | A | 6/2013 |
| KR | 10-2005-0073221 | A | 7/2005 |
| KR | 10-2010-0006461 | A | 1/2010 |
| KR | 10-0967899 | B1 | 7/2010 |
| KR | 1020120026922 | A | 3/2012 |
| KR | 10-2012-0086274 | A | 8/2012 |
| KR | 1020120109339 | A | 10/2012 |
| TW | 200712580 | A | 4/2007 |
| TW | 200951579 | A1 | 12/2009 |
| TW | 201027183 | A1 | 7/2010 |
| TW | 201042285 | A1 | 12/2010 |
| TW | 201245769 | A1 | 11/2011 |
| TW | 201239406 | A1 | 10/2012 |
| WO | 2005017612 | A1 | 2/2005 |
| WO | 2011/103581 | A2 | 8/2011 |

\* cited by examiner

Fig. 3

| UR | UL | UR | UL | UR |
|----|----|----|----|----|

Fig. 4

| UR | UL | UR | UL | UR |
|----|----|----|----|----|
| UL | UR | UL | UR | UL |
| UR | UL | UR | UL | UR |
| UL | UR | UL | UR | UL |
| UR | UL | UR | UL | UR |

Fig. 5

| FR | FL | FR | FL | FR |
|---|---|---|---|---|

Fig. 6

| FR | FL | FR | FL | FR |
|---|---|---|---|---|
| FL | FR | FL | FR | FL |
| FR | FL | FR | FL | FR |
| FL | FR | FL | FR | FL |
| FR | FL | FR | FL | FR |

DISPLAY DEVICE

This application is a bypass continuation of International Application No. PCT/KR2013/011044 filed Nov. 29, 2013, which claims priority to Korean Patent Application Nos. 10-2012-0137400 filed Nov. 29, 2012 and 10-2013-0147933 filed Nov. 29, 2013, in the Korean Intellectual Property Office, all of which are incorporated herein by reference.

BACKGROUND

1. Field of the Invention

The present invention relates to a display device and polarizing glasses.

2. Discussion of Related Art

In recent years, owing to the increased demand for 3-dimensional stereoscopic images in the field of games or films, display devices configured to display the 3-dimensional stereoscopic images have been developed. A method of viewing and recognizing a 3-dimensional stereoscopic image may include viewing and recognizing a pair of 2-dimensional plane images through the both eyes of an observer, fusing the pair of 2-dimensional plane images in the observer's brain, and viewing and recognizing a stereoscopic effect.

Stereoscopic image display devices may be classified into glasses-type stereoscopic image display devices, such as a shutter-glasses type and a polarized-glasses type, and non-glasses-type stereoscopic image display devices, such as a barrier type or a lenticular type, depending on whether or not a user needs to wear glasses.

Patent document 1 disclosed in Korean Unexamined Patent Publication No. 2010-0006461 describes a stereoscopic image display device using polarizing glasses.

SUMMARY OF THE INVENTION

According to an aspect of the present invention, there is provided a display device, a stereoscopic image emitted from which can be observed after wearing polarizing glasses comprising a left-eye region and a right-eye region, each of which comprises a uniaxial retardation layer and a polarizer. The display device includes a display unit configured to generate a left-eye image signal and a right-eye image signal, and a filter unit including a first region and a second region respectively having retardation layers to differently control polarization states of the left-eye image signal and the right-eye image signal generated by the display unit. The retardation layers of the first and second regions of the filter unit may have uniaxiality with the opposite sign to the uniaxial retardation layer of the polarizing glasses, and the retardation layers of the first and second regions of the filter unit may have the same wavelength dispersion characteristics.

According to another aspect of the present invention, there is provided polarizing glasses for observing a stereoscopic image emitted from a display device including a display unit configured to generate a left-eye image signal and a right-eye image signal, a filter unit including a first region and a second region respectively having uniaxial retardation layers to differently control polarization states of a left-eye image signal and a right-eye image signal generated by the display unit, and a polarizer interposed between the display unit and the filter unit, wherein the uniaxial retardation layers of the first and second regions of the filter unit have the same wavelength dispersion characteristics. The polarizing glasses include a left-eye region and a right-eye region. Each of the left-eye region and the right-eye region includes a polarizer and a uniaxial retardation layer with the opposite sign to the uniaxial retardation layers of the first and second regions of the filter unit.

According to another aspect of the present invention, there is provided a stereoscopic image observation apparatus including the display device and the polarizing glasses.

EFFECTS

The present invention provides a display device configured to allow a user to wear polarizing glasses including a positive or negative uniaxial retardation layer and observe stereoscopic images. The display device includes a uniaxial retardation layer with the opposite sign to the uniaxial retardation layer included in the polarizing glasses and control wavelength dispersion characteristics of the filter unit so that the display device can have highly improve upper, lower, left, and right viewing angles.

BRIEF DESCRIPTION OF THE DRAWINGS

FIGS. 3 and 4 are schematic diagrams of examples of disposition of UL and UR regions according to exemplary embodiments of the present invention;

FIGS. 5 and 6 are schematic diagrams of examples of disposition of FL and FR regions according to exemplary embodiments of the present invention;

EXPLANATION OF THE MARKS IN THE FIGURES

Figure 1:
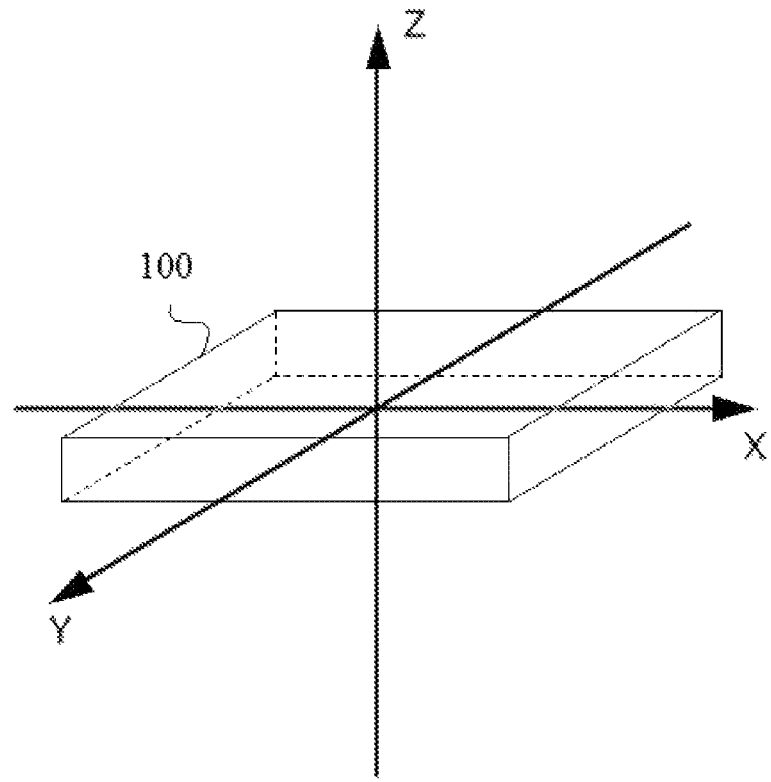
FIG. 1 is a schematic diagram of x-, y-, and z-axes of a retardation layer or film according to an exemplary embodiment of the present invention.

1: Display device
10: light source
11: display unit
12A, 12B: polarizer of the display unit
13: filter unit
2: polarizing glasses
21: left-eye region
21A: retardation layer of the polarizing glasses
21B: polarizer of the polarizing glasses
22: right-eye region
22A: retardation layer of the polarizing glasses
22B: polarizer of the polarizing glasses
100: retardation layer or film

DETAILED DESCRIPTION OF EXEMPLARY EMBODIMENTS

A display device according to an exemplary embodiment of the present invention may be a display configured to allow a user to wear polarizing glasses and observe stereoscopic images.

The present invention relates to a display device, a stereoscopic image emitted from which can be observed after wearing polarizing glasses comprising a left-eye region and a right-eye region, each of which comprises a uniaxial retardation layer and a polarizer.

The display device may include a display unit configured to generate a left-eye image signal and a right-eye image signal; and a filter unit including a first region and a second region respectively having retardation layers to differently control polarization states of the left-eye image signal and the right-eye image signal generated by the display unit. Also, the retardation layers of the first and second regions of the filter unit may have uniaxiality with the opposite sign to the uniaxial retardation layer of the polarizing glasses. The retardation layers of the first and second regions of the filter unit may have the same wavelength dispersion characteristics.

As described above, the polarizing glasses may include the left-eye region and the right-eye region to which the left-eye image signal and the right-eye image signal for observing stereoscopic images are respectively incident. The left-eye region may include the retardation layer and the polarizer, and the right-eye region may include the retardation layer and the polarizer. The retardation layer and the polarizer included in each of the left-eye region and the right-eye region may be disposed such that a signal emitted by the display device are sequentially transmitted through the retardation layer and the polarizer and incident to the left eye or the right eye.

Herein, terms "polarizer" and "polarizing plate" are used to distinguish one element from another. That is, the term "polarizer" may refer to a sheet or film configured to serve a polarization function, for example, a polyvinyl alcohol (PVA) film used as an absorptive polarizer, and the term "polarizing plate" may refer to a film obtained by further stacking a film, sheet, or layer on a polarizer. For example, the stacked film, sheet, or layer may be a polarizer protection film.

The retardation layer included in each of the left-eye region and the right-eye region may be a uniaxial retardation layer. Also, the retardation layer of each of the first and second regions may be a uniaxial retardation layer. The term "uniaxial retardation layer" may refer to a layer or film in which two of an x-axial refractive index (hereinafter, $n_{max}$), a y-axial refractive index (hereinafter, $n_{min}$), and a z-axial refractive index (hereinafter, $n_z$) are the same, and the remaining one thereof is different. Herein, "the same" is referred to as being "substantially the same". For example, as shown in FIG. 1, an x-axis may refer to any one direction on a surface of a retardation layer or film 100, a y-axis may refer to an in-plane direction vertical to the x-axis, and a z-axis may refer to a direction normal to a plane surface formed by the x-axis and the y-axis, for example, a thickness-wise direction of the retardation layer or film 100.

As described above, the display device may include a display unit configured to generate a left-eye image signal and a right-eye image signal and a filter unit. The display unit and the filter unit may be disposed such that an image signal generated by the display unit is transmitted through the filter unit to the side of an observer. The filter unit may include the first and second regions configured to receive the left-eye image signal and the right-eye image signal generated by the display unit, differently control polarization states of the left-eye and right-eye image signals, and emit the controlled left-eye and right-eye image signals. The first region may include the retardation layer, and the second region may also include the retardation layer. In an example, any one of the left-eye and right-eye image signals transmitted through each of the first and second regions may be a left-circularly polarized signal, and the other one thereof may be a right-circularly polarized signal.

The retardation layer of the filter unit may be a uniaxial retardation layer, and the retardation layers of the first and second regions may include optical axes formed in different directions. Herein, the term "optical axis" may refer to a slow axis or fast axis during transmission of light through the corresponding region. Unless expressly defined otherwise, the term "optical axis" may refer to the slow axis.

In addition, the retardation layers of the first and second regions may have uniaxiality with the opposite sign to the uniaxial retardation layer of the polarizing glasses. This may indicate that when the retardation layer of the filter unit is a positive uniaxial retardation layer, the retardation layer of the polarizing glasses is a negative uniaxial retardation layer, and when the retardation layer of the filter unit is a negative uniaxial retardation layer, the retardation layer of the polarizing glasses is a positive uniaxial retardation layer.

Herein, the term "positive uniaxial retardation layer" refers to a uniaxial retardation layer of which $n_{max}$, $n_{min}$, and $n_z$ satisfy Equation 1, and the term "negative uniaxial retardation layer" refers to a uniaxial retardation layer of which $n_{max}$, $n_{min}$, and $n_z$ satisfy Equation 2:

$$n_{max} > n_{min} = n_z \quad (1),$$

and $$n_{max} = n_z > n_{min} \quad (2).$$

In addition, the retardation layer of the first and/or second region may have an in-plane retardation specified by Equation 3:

$$R(\lambda) = d \times (n_e - n_o),$$

wherein $R(\lambda)$ is an in-plane retardation, d is the thickness of the retardation layer, $n_e$ is an extraordinary refractive index, and $n_o$ is an ordinary refractive index. $n_e$ may refer to a different refractive index obtained in one direction out of $n_{max}$, $n_{min}$, and $n_z$, and $n_o$ may refer to the same refractive index obtained in two directions out of $n_{max}$, $n_{min}$, and $n_z$. Accordingly, for example, $n_e$ of the positive uniaxial retardation layer that satisfies Equation 1 may be $n_{max}$, and $n_e$ of the negative uniaxial retardation layer that satisfies Equation 2 may be $n_{min}$.

In an example, the retardation layer of the filter unit may be a $\lambda/4$ wavelength layer to convert a signal generated by the display unit into a circularly polarized signal. Herein, the term "$n\lambda$ wavelength layer" may refer to a phase delay element capable of delaying the phase of incident light by n times. Here, n may be, for example, ¼, ½, or ¾.

In an example, when the $\lambda/4$ wavelength layer is a positive uniaxial retardation layer, the $\lambda/4$ wavelength layer may be a wavelength layer having a retardation of about 50 to 200 nm, 60 to 190 nm, 70 to 180 nm, 80 to 170 nm, 90 to 160 nm, 100 to 155 nm, 110 to 150 nm, 120 to 145 nm, 130 to 140 nm, or 135 to 140 nm in the wavelength of about 550 nm.

In another example, when the $\lambda/4$ wavelength layer is a negative uniaxial retardation layer, the $\lambda/4$ wavelength layer may refer to a wavelength layer having a retardation of about −50 to −200 nm, about −60 to −190 nm, about −70 to −180 nm, about −80 to −170 nm, about −90 to −160 nm, about −100 to −155 nm, about −110 to −150 nm, about −120 to −145 nm, about −130 to −140 nm, or about −135 to −140 nm in the wavelength of about 550 nm. The retardation may be, for example, an in-plane retardation specified by Equation 3.

Herein, unless expressly defined otherwise, the retardation may refer to a retardation measured in the wavelength of about 550 nm.

In a specific example of the present invention, each of the retardation layers of the first and second regions of the filter unit and the retardation layer of the polarizing glasses may be a retardation layer having normal wavelength dispersion characteristics (hereinafter, N characteristics), flat wavelength dispersion characteristics (hereinafter, F characteristics), or reverse wavelength dispersion characteristics (hereinafter, R characteristics).

Herein, $R(\lambda)$ used in the process of explaining the wavelength dispersion characteristics of the retardation layer may refer to a retardation of the retardation layer, which is measured with respect to light having the wavelength of about $\lambda$ nm. For instance, $R(450)$, $R(550)$, and $R(650)$ may respectively refer to retardations measured with respect to light having the wavelengths of about 450 nm, about 550 nm, and 650 nm.

Herein, unless expressly defined otherwise, the term "retardation layer having N characteristics" may refer to a retardation layer in which $R(450)/R(550)$ is greater than $R(650)/R(550)$. In an example, in the retardation layer having the N characteristics, $R(450)/R(550)$ may range from 1.01 to 1.19, 1.02 to 1.18, 1.03 to 1.17, 1.04 to 1.16, 1.05 to 1.15, 1.06 to 1.14, 1.07 to 1.13, 1.08 to 1.12, or 1.09 to 1.11. Also, in the retardation layer having the N characteristics, $R(650)/R(550)$ may range from 0.81 to 0.99, 0.82 to 0.98, 0.83 to 0.97, 0.84 to 0.96, 0.85 to 0.95, 0.86 to 0.94, 0.87 to 0.93, 0.88 to 0.92, or 0.89 to 0.91. Furthermore, in the retardation layer having the N characteristics, $\{R(650)-R(450)\}/\{200 \times R(550)\}$ may range from −0.0019 to −0.0001, −0.0018 to −0.0002, −0.0017 to −0.0003, −0.0016 to −0.0004, −0.0015 to −0.0005, −0.0014 to −0.0006, −0.0013 to −0.0007, −0.0012 to −0.0008, or −0.0011 to −0.0009, or be about −0.001.

Herein, unless expressly defined otherwise, the term "retardation layer having F characteristics" may refer to a retardation layer in which $R(450)/R(550)$ is substantially equal to $R(650)/R(550)$. In an example, in the retardation layer having the F characteristics, each of $R(450)/R(550)$ and $R(650)/R(550)$ may range from 1.01 to 1.19, 1.02 to 1.18, 1.03 to 1.17, 1.04 to 1.16, 1.05 to 1.15, 1.06 to 1.14, 1.07 to 1.13, 1.08 to 1.12, or 1.09 to 1.11. Furthermore, in the retardation layer having the F characteristics, $\{R(650)-R(450)\}/\{200 \times R(550)\}$ may be within ±0.0009, ±0.0008, ±0.0007, ±0.0006, ±0.0005, ±0.0004, ±0.0003, ±0.0002, or ±0.0001, or be about 0.

Herein, unless expressly defined otherwise, the term "retardation layer having R characteristics" may refer to a retardation layer in which $R(450)/R(550)$ is less than $R(650)/R(550)$. In an example, in the retardation layer having the N characteristics, $R(450)/R(550)$ may range from 0.81 to 0.99, 0.82 to 0.98, 0.83 to 0.97, 0.84 to 0.96, 0.85 to 0.95, 0.86 to 0.94, 0.87 to 0.93, 0.88 to 0.92, or 0.89 to 0.91. Also, in the retardation layer having the N characteristics, $R(650)/R(550)$ may range from 1.01 to 1.19, 1.02 to 1.18, 1.03 to 1.17, 1.04 to 1.16, 1.05 to 1.15, 1.06 to 1.14, 1.07 to 1.13, 1.08 to 1.12, or 1.09 to 1.11. Furthermore, in the retardation layer having the N characteristics, $\{R(650)-R(450)\}/\{200 \times R(550)\}$ may range from 0.0001 to 0.0019, 0.0002 to 0.0018, 0.0003 to 0.0017, 0.0004 to 0.0016, 0.0005 to 0.0015, 0.0006 to 0.0014, 0.0007 to 0.0013, 0.0008 to 0.0012, or 0.0009 to 0.0011, or be about 0.001.

In a specific example of the present invention, the retardation layers of the first and second regions of the filter unit may have the same wavelength dispersion characteristics. Accordingly, in an example, when the retardation layer of the first region has normal wavelength dispersion characteristics, the retardation layer of the second region may have normal wavelength dispersion characteristics. Also, both the uniaxial retardation layers of the right-eye and left-eye regions of the polarizing glasses may have normal wavelength dispersion characteristics, flat wavelength dispersion characteristics, or reverse wavelength dispersion characteristics. Although the retardation layers of the right-eye and left-eye regions of the polarizing glasses may have the same wavelength dispersion characteristics as or different wavelength dispersion characteristics from the retardation layer of the filter unit, the retardation layers of the right-eye and left-eye regions may have the same wavelength dispersion characteristics. The retardation layers of the right-eye and left-eye regions may be controlled to have the same wavelength dispersion characteristics in terms of symmetrical characteristics. As described above, by controlling the retardation layers of the first and second regions of the filter unit to have the same wavelength dispersion characteristics, a display device capable of displaying high-quality stereoscopic images with highly improved upper, low, left, and right viewing angles may be provided.

Figure 2:
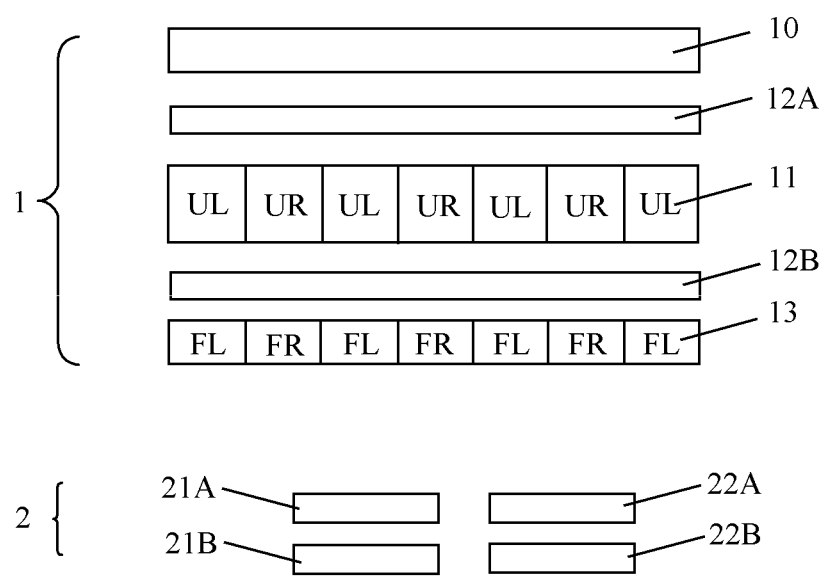
FIG. 2 is a schematic top view of a display device and polarizing glasses according to an exemplary embodiment of the present invention.

FIG. 2 is a schematic top view of a display device 1 and polarizing glasses 2 according to an exemplary embodiment of the present invention.

Referring to FIG. 2, the display device 1 may include a display unit 11 and a filter unit 13. Also, as shown in FIG. 2, the display device 1 may further include a second polarizer 12B interposed between the display unit 11 and the filter unit 13. Also, the display device 1 may further include a first polarizer 12A and a light source 10 sequentially disposed on the opposite side of the polarizer 12B of the display unit 11. Hereinafter, for brevity, the polarizer 12A interposed between the light source 10 and the display unit 11 will be referred to as a first polarizer, and the polarizer 12B disposed on the opposite side of the first polarizer will be referred to as a second polarizer.

Each of the first and second polarizers 12A and 12B included in the display device 1 may be an optical element including a transmission axis and an absorption axis vertical to the transmission axis. When light is incident to a polarizer, the polarizer may transmit only light having a polarization axis parallel to a direction of the transmission axis of the polarizer among the incident light.

In an example, the absorption axis of the first polarizer 12A included in the display device 1 may be vertical to the absorption axis of the second polarizer 12B included in the display device 1. In this case, the transmission axes of the first and second polarizers 12A and 12B may also be vertical to each other.

Herein, terms used to define angles, for example, "vertical," "horizontal," "perpendicular," and "parallel", may respectively refer to expressions "substantially vertical", "substantially horizontal", "substantially perpendicular", and "substantially parallel" within such a range as not to damage desired effects. Accordingly, each of the terms may be used in consideration of, for example, a manufacturing error or a variation. For instance, each of the terms may include an error of within about ±15°, within about 10°, or within about ±5°.

For example, a direct-type or edge-type backlight unit (BLU), which is normally used for a liquid crystal display (LCD), may be used as the light source 10. In addition to the edge-type or edge-type BLU, various kinds of light sources may be used without limitation.

The display unit 11 of the display device 1 may generate image signals, for example, image signals including a left-eye image signal (hereinafter, an L signal) and a right-eye image signal (hereinafter, an R signal), in a driving state. In an example, the display unit 11 may include a left-eye image signal generating region (hereinafter, an UL region) configured to generate the L signal in the driving state and a right-eye image signal generating region (hereinafter, an UR region) configured to generate the R signal in the driving state.

The display unit 11 may be, for example, a region including a transmissive liquid crystal (LC) panel or a region formed by an LC layer of the LC panel. The transmissive LC panel may include, for example, a first substrate, a pixel electrode, a first alignment film, a common electrode, and a second substrate, which may be sequentially provided from the side of the light source 10. For example, an active driver circuit including a thin film transistor (TFT) and lines may be formed as a driving element electrically connected to a transparent pixel electrode on the first substrate provided on the side of the light source 10. The pixel electrode may include, for example, indium tin oxide (ITO), and serve as an electrode for each pixel. Also, a first or second alignment film may include a material, for example, polyimide. The LC layer may include, for example, vertical alignment (VA)-mode LCs, twisted-nematic (TN)-mode LCs, super-twisted nematic (STN)-mode LCs, or in-plane switching (IPS)-mode LCs. The LC layer may function to transmit or block light emitted from the light source 10 in each pixel due to a voltage applied from the driver circuit. The common electrode may include, for example, ITO, and function as a common opposite electrode.

The display unit 11 may include the UL region and the UR region formed by at least one pixel. The UL region and the UR region may generate an L signal or an R signal in the driving state. For example, a unit pixel including LCs sealed between the first and second alignment layers or a combination of at least two unit pixels may form the UL or UR region in the LC panel.

UL and UR regions may be disposed in a row and/or column direction. FIG. 3 illustrates disposition of UL and UR regions according to an exemplary embodiment of the present invention. As shown in FIG. 3, the UL and UR regions may have stripe shapes extending in a common direction and be alternately disposed adjacent to one another. FIG. 4 illustrates disposition of UL and UR regions according to another exemplary embodiment of the present invention, in which the UL and UR regions are alternately disposed adjacent to one another and form a grid pattern. The disposition of the UL and UR regions is not limited to those of FIGS. 3 and 4, and various designs known to one skilled in the art may be applied thereto.

The display unit 11 may drive pixels of respective regions in response to signals in a driving state and generate image signals including L and R signals.

For example, referring to FIG. 2, when light emitted from the light source 10 is incident to the first polarizer 12A, only light polarized parallel to the transmission axis of the polarizer 12A may be transmitted through the polarizer 12A. When the transmitted light is incident to the display unit 11, the light transmitted through the UL region may become an L signal and the light transmitted through the UR region may become an R signal. When the LR and R signals are incident to the second polarizer 12B, only a signal polarized parallel to the transmission axis of the polarizer 12B may be transmitted through the polarizer 12B and incident to the filter unit 13. The transmission axes of the first and second polarizers 12A and 12B may be vertical to each other.

The filter unit 13 may include the first region and the second region configured to divide an image signal generated by the display unit 11 into at least two different kinds of signals having different polarization states in the driving state. Any one of the first and second regions may be a left-eye image signal polarization control region (hereinafter, FL region) to which an L signal of signals transmitted from the display unit 11 may be incident, and the other thereof may be a right-eye image signal polarization control region (hereinafter, FR region) to which an R signal of the signals transmitted from the display unit 11 may be incident. Herein, the first region may be synonymous with the FL region, and the second region may be synonymous with the FR region.

The FL region of the filter unit 13 may be disposed in a position corresponding to the UL region to have a size corresponding to the UL region so that the L signal generated and transmitted by the UL region can be incident to the FL region of the filter unit 13 in a driving state. The FR region of the filter unit 13 may be disposed in a position corresponding to the UR region to have a size corresponding to the UR region so that the R signal generated and transmitted by the UR region can be incident to the FR region of the filter unit 13 in the driving state. The formation of the FL or FR region in the position corresponding to the UL or UR region to have the size corresponding to the UL or UR region may indicate that the L signal generated by the UR region may be incident to the FL region, and the R signal generated by the UR region may be incident to the FR region. However, this may not necessarily indicate that the FL and FR regions are formed in the same position to have the same size.

For example, the FL and FR regions may be alternately formed adjacent to one another in stripe shapes extending in a common direction to correspond to the disposition of the UL and UR regions of the display unit. Alternatively, the FL and FR regions may be alternately disposed adjacent to one another to form a grid pattern. For instance, when the UL and UR regions are disposed as shown in FIG. 3, the FL and FR regions may be disposed as shown in FIG. 5. When the UL and UR regions are disposed as shown in FIG. 4, the FL and FR regions may be disposed as shown in FIG. 6.

In a driving state, a signal transmitted through the FL region and a signal transmitted through the FR region may have different polarization states.

For example, any one of the signal transmitted through the FL region and the signal transmitted through the FR region may be a left-circularly polarized signal, and the other thereof may be a right-circularly polarized signal. In this case, the L signal generated by the display unit may be incident to the FL region through the second polarizer and then emitted in a left-circularly polarized state or right-circularly polarized state. Also, the R signal generated by the display unit may be incident to the FR region through the second polarizer and then emitted in a right-circularly polarized state or left-circularly polarized state so that a polarization axis of the R signal can rotate in an opposite direction to a direction in which a polarization axis of the L signal rotates.

An optical axis of the λ/4 wavelength layer disposed in the FL region of the filter unit 13 may be formed differently from an optical axis of the λ/4 wavelength layer disposed in the FR region of the filter unit 13 so that the FL and FR regions of the filter unit can generate circularly polarized light rotating in the opposite directions. In an example, the FL region may include a λ/4 wavelength layer having an optical axis in a first direction as a retardation layer, while the FR region may include a λ/4 wavelength layer having an optical axis in a second direction, which is different from the first direction, as a retardation layer.

In an example, any one of the first direction and the second direction may be a direction forming an angle of about 30° to about 70, about 35° to about 60°, about 40° to 50°, or about 45° with the absorption axis of the second polarizer clockwise, and the other thereof may be a direction forming an angle of about 30° to about 70°, about 35° to about 60°, about 40° to about 50°, or about 45° with the absorption axis of the second polarizer counterclockwise. Herein, a numerical value denoting an angle refers to a substantial numerical value within such a range as not to damage desired effects. In an example, the first region may have an optical axis forming an angle of about 30° to about 70° with the absorption axis of the polarizer clockwise, and the second region may have an optical axis forming an angle of about 30° to about 70° with the absorption axis of the polarizer counterclockwise. Accordingly, a numerical value denoting an angle may be obtained in consideration of, for example, a manufacturing error or a variation. For instance, the numerical value denoting the angle may include an error of within about ±15°, within about 10°, or within about ±5°.

In an example, the absorption axis of the polarizer of the left-eye region and the absorption axis of the polarizer of the right-eye region may be formed parallel to each other. The absorption axes of the respective polarizers formed to be parallel to each other are perpendicular to an absorption axis of the first polarizing plate under the state where the polarizing glasses are positioned so as for an imaginary line connecting centers of the right-eye region and the left-eye region to be perpendicular or parallel to a boundary line between the first and second regions of the display device. In this state, the display device may enable a user to observe high-quality stereoscopic images.

Figure 7:
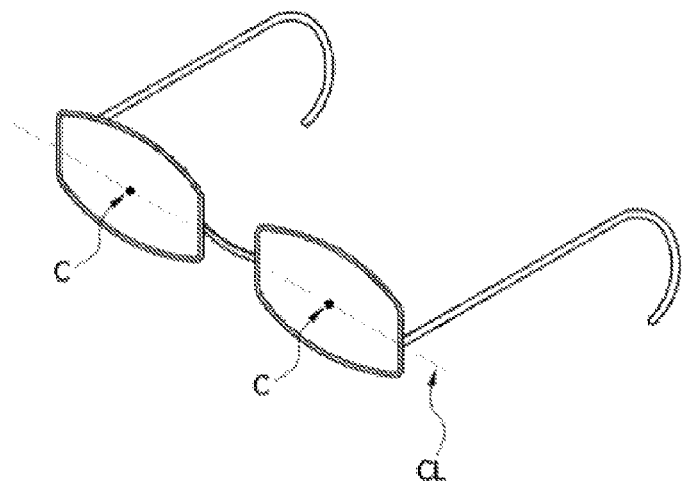
FIG. 7 is a diagram for describing the centers of gravity of left-eye and right-eye regions of polarizing glasses and an imaginary line connecting the centers of gravity.

Herein, as shown in FIG. 7, an imaginary line connecting the centers of the left-eye region and the right-eye region of the polarizing glasses may be, for example, an imaginary line CL connecting the centers C of the left-eye region and the right-eye region. Also, the center C of each of the left-eye region and the right-eye region may refer to the center of gravity.

In addition, when the imaginary line connecting the centers of the left-eye region and the right-eye region is disposed at perpendicular to or parallel to a boundary line between the first and second regions of the display device, an optical axis of the retardation layer of the first region and an optical axis of the retardation layer of the left-eye region may be formed in the same direction, and an optical axis of the retardation layer of the second region and an optical axis of the retardation layer of the right-eye region may be formed in the same direction.

Each of the retardation layers of the filter unit and the retardation layers of the left-eye region and the right-eye region may be a retardation layer known to one skilled in the art. For example, each of the retardation layers may be an LC film or an optical anisotropic polymer film.

The retardation layer may include a base layer and an LC layer formed on a surface of the base layer and including an aligned rod-shaped LC compound, an aligned discotic LC compound, or a colesteric LC compound.

The base layer may be a base layer of which an absolute value of a thickness-wise retardation is within about 100 nm, about 90 nm, within about 80 nm, within about 70 nm, within about 60 nm, within about 50 nm, within about 40 nm, within about 30 nm, within about 20 nm, within about 10 nm, within about 5 nm, within about 3 nm, or within about 1 nm, or be about 0 nm. As the absolute value of the thickness-wise retardation of the base layer becomes smaller, a display device and/or polarizing glasses having an improved viewing angle may be provided.

The base layer may be formed of, for example, triacetyl cellulose (TAC), a cyclic olefin polymer (COP), a cyclic olefin copolymer (COC), or zero retardation tryacetyl cellulose (0RT).

In an example, when an LC layer is used for a positive uniaxial retardation layer, the LC film may include an aligned rod-shaped LC compound. The LC layer may include, for example, a rod-shaped LC compound polymerized in a horizontally aligned state. Herein, the term "horizontal alignment" may refer to a case in which an optical axis of the LC layer including an LC compound has a inclination angle of about 0° to about 25°, about 0° to about 15°, about 0° to about 10°, about 0° to about 5°, or about 0° with a plane surface of the LC film. For example, the LC layer may be prepared by aligning a polymeric LC compound with a nematic LC phase and polymerizing the aligned polymeric LC compound. The polymeric LC compound may be aligned using a known method without limitation, for example, an optical alignment method or a rubbing alignment method.

In another example, when an LC film is a negative uniaxial retardation layer, the LC layer may include an aligned discotic LC compound; or an cholesteric LC compound. Similarly, the LC layer may include, for example, a discotic LC compound or colesteric LC compound, which may be polymerized in a horizontally aligned state.

The optical anisotropic polymer film may be, for example, a film obtained by stretching an optical transmissive polymer film to which optical anisotropy may be given due to stretching, in an appropriate manner. Also, as long as an unstretched polymer film has optical anisotropy, the unstretched polymer film may also be used as the polymer film. The polymer film may be, for example, a film that may have an optical transmittance of about 70% or higher, about 80% or higher, or about 85% or higher and be fabricated using an absorbent cast technique. A film having a thickness of about 3 mm or less or a thickness of about 1 μm to 1 mm or about 5 μm to 500 μm may be typically used as the polymer film in consideration of possibility of generating a uniform stretched film.

In an example, when an optical anisotropic polymer film is used for a positive uniaxial retardation layer, the polymer film may be a cyclic olefin polymer (COP) film (e.g., polynorbornene film), a cellulose-ester-based polymer film (e.g., triacetyl cellulose (TAC)), cyclic olefin copolymer (COC), or polycarbonate (PC).

In another example, when the optical anisotropic polymer film is used for a negative uniaxial retardation layer, the polymer film may be polystyrene or a polymer film having a functional group having a high refractive index, such as a double band and/or an aromatic ring, on a side chain.

A construction known to one skilled in the art may be used as each of the first and second polarizers and the polarizers of the left-eye and right-eye regions without limitation. For example, a typical polarizer, such as a poly(vinyl alcohol) (PVA) linear polarizer, may be used as each of the first and second polarizers and the polarizers of the left-eye and right-eye regions. The typical polarizer may include a PVA-based resin film to and in which dichroic dye is adsorbed and aligned. A PVA-based resin constituting the typical polarizer may be obtained by, for example, gelling a polyvinyl acetate resin. A monopolymer of vinyl acetate; and a copolymer of vinyl acetate and another monomer capable of being copolymerized with vinyl acetate may be used as the polyvinyl acetate resin. Examples of the monomer capable of being copolymerized with vinyl acetate may include one of unsaturated carboxylic acid, olefins, vinyl esters, unsaturated sulfonic acid, and acryl amides having an ammonium group or a mixture of at least two thereof, but are not limited thereto. The PVA-based resin may typically have a gel content of about 85 mol % to 100 mol % or about 98 mol % or more. The PVA-based resin may be additionally modified. For example, polyvinyl formal or polyvinyl acetal modified into aldehydes may be used.

A polarizer protection film may be disposed on one side or both sides of each of the polarizers.

The polarizer protection film may be a polarizer protection film of which an absolute value of a thickness-wise retardation is within about 100 nm, within about 90 nm, within about 80 nm, within about 70 nm, within about 60 nm, within about 50 nm, within about 40 nm, without about 30 nm, within about 20 nm, within about 10 nm, without about 5 nm, within about 3 nm, or within about 1 nm, or be about 0 nm. As the absolute value of the thickness-wise retardation of the polarizer protection film becomes smaller, a display device and/or polarizing glasses having wider viewing angles may be provided.

The polarizer protection film may be, for example, triacetyl cellulose (TAC), a cyclic olefin polymer (COP), a cyclic olefin copolymer (COC), or zero retardation tryacetyl cellulose (0RT). Although the thickness of the polarization protection film is not specifically limited but may, for example, range from about 10 to 200 μm, about 50 to 100 μm, or about 70 to 90 μm. The thickness of the polarization protection film may be appropriately controlled according to the kind and use thereof.

The present invention provides polarizing glasses for observing a stereoscopic image emitted from a display device. The polarizing glasses may include a display unit capable of generating left-eye and right-eye image signals; a filter unit including a first region and a second region, each having a uniaxial retardation layer capable of differently controlling polarization states of the left-eye and right-eye image signals generated by the display unit; and a polarizer interposed between the display unit and the filter unit. The retardation layers of the first and second regions of the filter unit may have the same wavelength dispersion characteristics.

The polarizing glasses may include a left-eye region and a right-eye region. Each of the right-eye and left-eye regions may include a uniaxial retardation layer with the opposite sign to the retardation layer of the filter unit and the polarizer.

Polarizing glasses according to an exemplary embodiment of the present invention may be polarizing glasses for observing a stereoscopic image emitted from a display device. The polarizing glasses may be, for example, polarizing glasses configured to allow a user to observe stereoscopic images emitted by the above-described display device. The polarizing glasses may include a left-eye region and a right-eye region to which a left-eye image signal and a right-eye image signal required to observe stereoscopic images are respectively incident. The left-eye region may include the retardation layer and the polarizer, and the right-eye region may also include the retardation layer and the polarizer. The retardation layer and the polarizer included in each of the left-eye and right-eye regions may be disposed such that a signal emitted by the display device is sequentially transmitted through the retardation layer and the polarizer and incident to the left eye or the right eye.

The retardation layer included in each of the left-eye and right-eye regions may be a uniaxial retardation layer, for example, a uniaxial retardation layer with the opposite sign to the uniaxial retardation layer included in the filter unit of the display device.

As shown in FIG. 2, polarizing glasses 2 may include a left-eye region and a right-eye region. The left-eye region may include a retardation layer 21A and a polarizer 21B, while the right-eye region may include a retardation layer 22A and a polarizer 22B.

Like the polarizers included in the display device, each of the polarizers 21B and 22B included in the polarizing glasses 2 may be an optical element having an absorption axis formed in a predetermined direction and a transmission axis formed in a direction vertical to the direction of the absorption axis of the corresponding one of the polarizers 21B and 22B.

The left-eye and right-eye regions of the polarizing glasses 2 may include the retardation layers 21A and 22A, respectively. Each of the retardation layers 21A and 22A of the left-eye region and the right-eye region may satisfy the conditions of General expression 1 or 2 with the retardation layer included in each of the FL and FR regions of the filter unit.

$$D_L = |\theta_1 - \theta_L| \leq 15° \qquad (1)$$

$$D_R = |\theta_2 - \theta_R| \leq 15° \qquad (2).$$

In General expression 1, $D_L$ is a relative deviated degree of the optical axis of the retardation layer in the FL region and the optical axis of the retardation layer in the left-eye region, $\theta_1$ is an angle formed by the optical axis of the retardation layer in the FL region and the absorption axis of the second polarizer, $\theta_L$ is an angle formed by the optical axis of the retardation layer in the left-eye region and the absorption axis of the second polarizer under a state where the polarizing glasses are placed so as for the absorption axis of the polarizer in the left-eye region to be perpendicular to the absorption axis of the first polarizing plate. In General expression 2, $D_R$ is a relative deviated degree of the optical axis of the retardation layer in the FR region and the optical axis of the retardation layer in the right-eye region, $\theta_2$ is an angle formed by the optical axis of the retardation layer in the FR region and the absorption axis of the second polarizer, and $\theta_R$ is an angle formed by the optical axis of the retardation layer in the right-eye region and the absorption axis of the second polarizer under a state where the polarizing glasses are placed so as for the absorption axis of the polarizer in the right-eye region to be perpendicular to the absorption axis of the second polarizer.

In General expressions 1 and 2, although the respective angles $\theta_1$, $\theta_2$, $\theta_L$, and $\theta_R$ may be measured clockwise or counterclockwise from the absorption axis of the second polarizer, the respective angles substituted into the same formula may be measured in the same direction.

Figure 8:
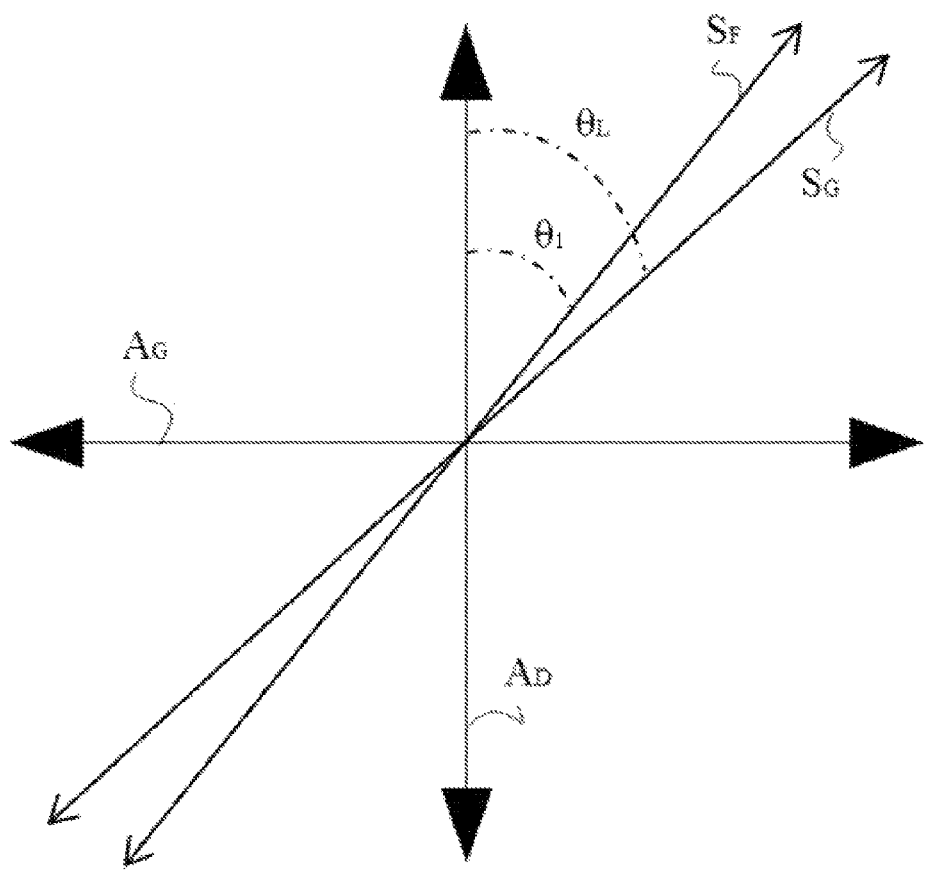
FIGS. 8 and 9 are diagrams for describing $D_L$ and $D_R$ according to an exemplary embodiment of the present invention.
Figure 9:
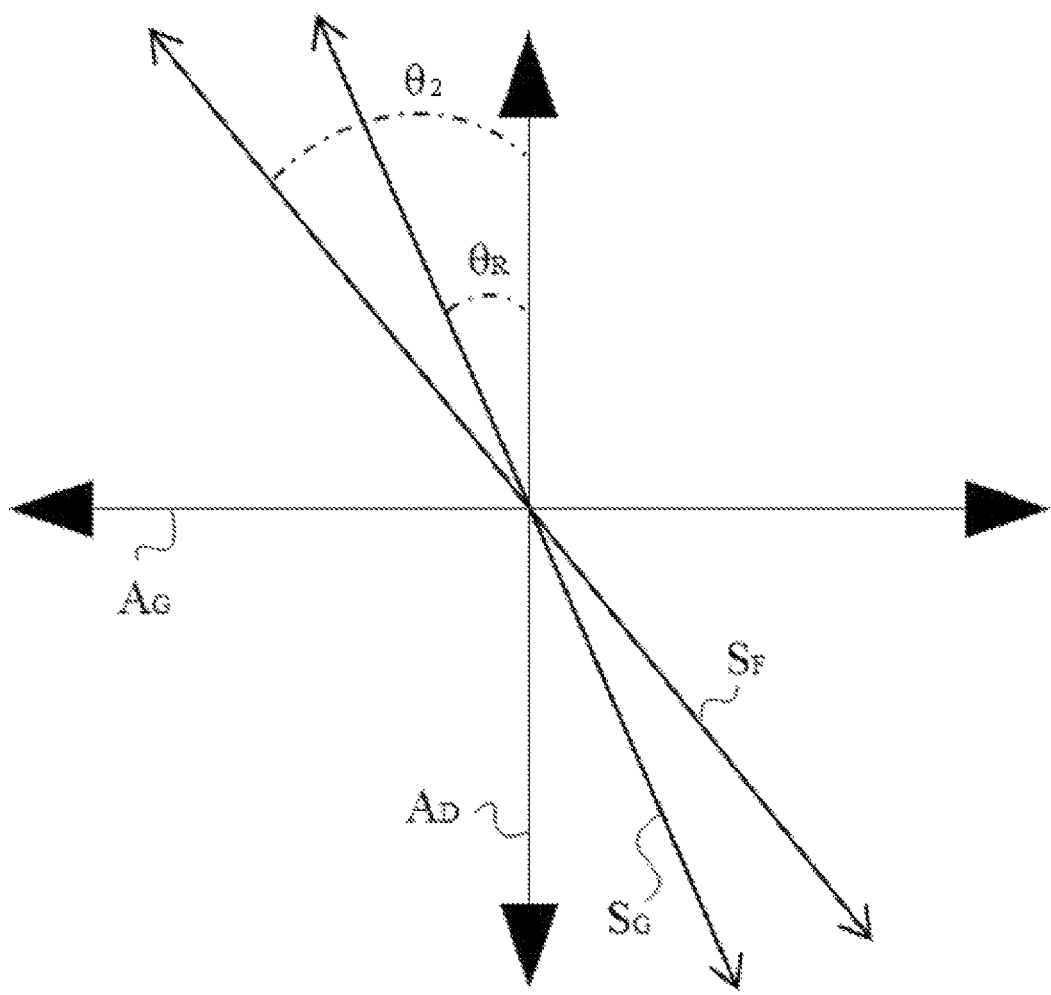

FIG. 8 is a schematic diagram showing an angle relationship of $D_L$ in General expression 1. When an absorption axis $A_D$ of the second polarizer is disposed at perpendicular to an absorption axis $A_G$ of a polarizer of a left-eye region, an angle of an optical axis $S_F$ of the retardation layer of the FL region measured clockwise from the absorption axis $A_D$ of the second polarizer may be denoted by $\theta_1$, and an angle of an optical axis $S_G$ of the retardation layer of the left-eye region measured clockwise from the absorption axis $A_D$ of the second polarizer may be denoted by $\theta_L$. FIG. 9 is a schematic diagram showing an angle relationship of $D_R$ in General expression 2. When the absorption axis $A_D$ of the second polarizer is disposed at perpendicular to the absorption axis $A_G$ of the polarizer of the right-eye region, an angle of an optical axis $S_F$ of the FR region measured counterclockwise from the absorption axis $A_D$ of the second polarizer may be denoted by $\theta_2$, and an angle of an optical axis $S_G$ of the retardation layer of the right-eye region measured counterclockwise from the absorption axis $A_D$ of the second polarizer may be denoted by $\theta_R$.

In General expression 1, $D_L$ may be, for example, about 14° or less, 13° or less, 12° or less, 11° or less, 10° or less, 9° or less, 8° or less, 7° or less, 6° or less, or 5° or less. Also, in General expression 2, DR may be, for example, 14° or less, 13° or less, 12° or less, 11° or less, 10° or less, 9° or less, 8° or less, 7° or less, 6° or less, or 5° or less.

In an example, the retardation layer included in the left-eye region may have substantially the same retardation as the retardation layer included in the FL region of the filter unit. Also, the retardation layer included in the right-eye region may have substantially the same retardation as the retardation layer included in the FR region of the filter unit. The retardation may be, for example, an in-plane retardation specified by Equation 3.

Accordingly, the retardation layer included in the FL region of the filter unit and the retardation layer included in the left-eye region may be, for example, uniaxial retardation layers that may have substantially the same retardation and optical axes formed in substantially the same direction on the basis of the second polarizer but have the opposite signs. Also, the retardation layer included in the FR region of the filter unit and the retardation layer included in the right-eye region may be, for example, uniaxial retardation layers that may have substantially the same retardation and optical axes formed in substantially the same direction on the basis of the second polarizer but have the opposite signs. When the retardation layer of the filter unit and the retardation layer of the polarizing glasses have unaxiality with the opposite signs, a display device may provide wide upper, lower, left, and right viewing angles.

Furthermore, as described above, the retardation layers of the first and second regions of the filter unit may have the same wavelength dispersion characteristics, and wavelength dispersion characteristics of the retardation layers of the right-eye region and the left-eye region may be the same as or different from the wavelength dispersion characteristics of the retardation layers of the first and second regions of the filter unit. However, the retardation layers of the right-eye region and the left-eye region may have the same wavelength dispersion characteristics.

In addition to the above-described elements, the display device and the polarizing glasses according to the present invention may further include elements known to one skilled in the art.

Hereinafter, the display device and polarizing glasses will be described in further detail with reference to Examples and Comparative examples, the display device and polarizing glasses are not limited by Examples and Comparative examples set forth herein.

1. A Method of Estimating Retardation

A retardation of a retardation layer was measured using Axoscan (available from Axomatrics), which was an apparatus capable of measuring 16 Muller matrices. Specifically, 16 Muller matrices of the retardation layer were obtained using the apparatus according to a Manufacturer's manual, and the retardation was extracted using the 16 Muller matrices.

2. A Method of Estimating Crosstalk

Figure 10:
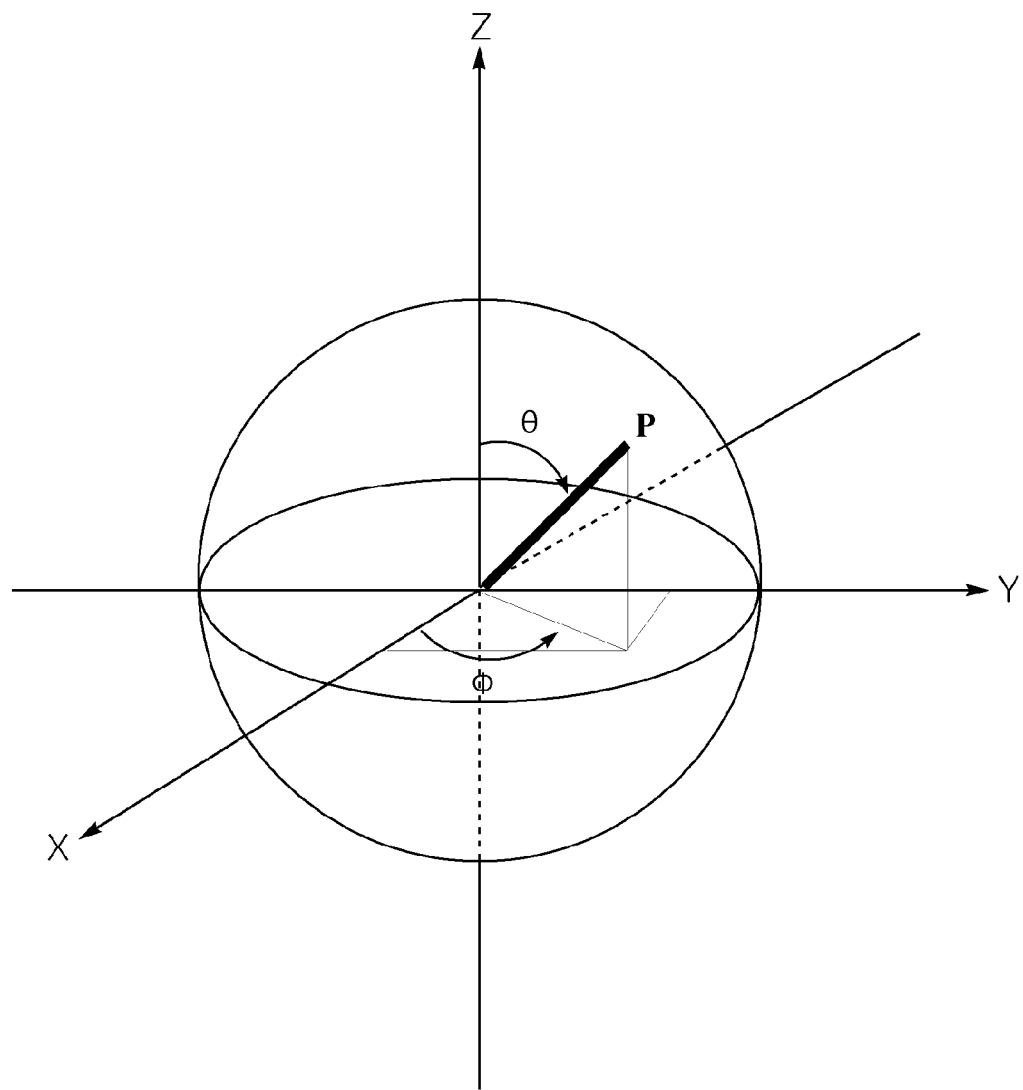
FIG. 10 is a diagram for describing an azimuthal angle and a inclination angle.

A crosstalk ratio of a display device may be measured as described below. Initially, polarizing glasses may be located at an observation point in which a crosstalk ratio is intended to be measured based on the display device. The observation point may be a spot spaced from the center of the display device a distance corresponding to 3/2 times a horizontal length of the display device. As shown in FIG. 10, the spot may be specified by a predetermined azimuthal angle $\Phi$ and/or inclination angle $\theta$. Assuming that an observer is observing a stereoscopic image, the horizontal length of the display device may be a horizontal length (e.g., a width) of the display device measured on the basis of the observer. Meanwhile, referring to FIG. 10, assuming that an X-axial direction is the observer's observation point and the origin of coordinates is the center of the display device, the azimuthal angle $\Phi$ may be 0°, and the inclination angle $\theta$ may be 90°. Accordingly, as the observation point changes to left or right in a Y-axial direction, the azimuthal angle $\Phi$ may be differently determined. Similarly, as the observation point changes upward or downward in a Z-axial direction, the inclination angle $\theta$ may also be differently determined. In the above-described disposition, when the display device is controlled to output an L signal, luminance meters named SR-UL2 Spectrometer may be respectively disposed on rear surfaces of the left-eye and right-eye regions of the polarizing glasses, and luminance may be measured in each of the cases. In this case, luminance measured on the rear surface of the left-eye region may be light luminance, while luminance measured on the rear surface of the right-eye region may be dark luminance. After measuring each of the light and dark luminances, a ratio([dark luminance]/[light luminance]) of dark luminance to light luminance may be obtained, and a percentage of the ratio may be defined as a crosstalk ratio (CT %). Also, although the crosstalk ratio may be measured in the same manner as described above by obtaining light luminance and dark luminance when the display device is controlled to output an R signal. In this case, luminance measured on the rear surface of the left-eye region may be dark luminance, while luminance measured on the rear surface of the right-eye region may be light luminance. Similarly, a percentage of a ratio([dark luminance]/[light luminance]) of dark luminance to light luminance may be defined as a crosstalk ratio.

Example 1

(1) Manufacture of Display Device and Polarizing Glasses

A display device had the same structure as shown in FIG. 2. The display device was configured such that a display unit 11 was a transmissive LC panel in which UL and UR regions were disposed as shown in FIG. 3, and a filter unit 13 included FL and FR regions disposed as shown in FIG. 5.

In the display device 1, a positive uniaxial retardation layer having a λ/4-wavelength phase delay characteristic was disposed in the FL region of the filter unit 13 as a retardation layer having a slow axis forming an angle of about 45° with an absorption axis of a second polarizer 12B clockwise. A positive uniaxial retardation layer having a λ/4-wavelength phase delay characteristic was disposed in the FR region of the filter unit as a retardation layer having a slow axis forming an angle of about 45° with the absorption axis of the second polarizer 12B counterclockwise.

Furthermore, a positive uniaxial retardation film having normal wavelength dispersion characteristics in which R(450)/R(550) was 1.18 and R(650)/R(550) was 0.92 was used as each of the retardation layers of the FL and FR regions. In addition, each of the retardation layers of the right-eye region and the left-eye region of polarizing glasses 2 had normal wavelength dispersion characteristics in which R(450)/R(550) was 1.18 and R(650)/R(550) was 0.92.

The display device 1 was configured such that the absorption axis of the second polarizer 12B was parallel to a horizontal direction of the apparatus, and the absorption axis of the first polarizer 12A was vertical to the absorption axis of the second polarizer 12B. While a user was wearing the polarizing glasses 2 including the left-eye and right-eye regions shown in FIG. 2 and observing an image emitted by the display device, a crosstalk ratio relative to an azimuthal angle and/or inclination angle was estimated. The absorption axes of the polarizers 21B and 22B of the polarizing glasses 2 may be formed parallel to each other. Also, when the polarizing glasses 2 were disposed such that an imaginary line (an imaginary line CL shown in FIG. 7) connecting the center of the left-eye region and the center of the right-eye region was vertical to a boundary line between the FL and FR regions of the display device 1, the absorption axis of the second polarizer 12B was disposed at vertical to absorption axes of polarizers of the left-eye and right-eye regions. Also, when the polarizing glasses 2 are disposed such that the absorption axes of the polarizers of the polarizing glasses 2 are vertical to the absorption axis of the second polarizer 12B, a negative uniaxial retardation layer having a ¼-wavelength phase delay characteristic and an optical axis formed in substantially the same direction as the retardation layer of the FL region was used as the retardation layer 21A of the left-eye region. When the polarizing glasses 2 are disposed such that the absorption axes of the polarizers of the polarizing glasses 2 are vertical to the absorption axis of the second polarizer 12B, a negative uniaxial retardation layer having a ¼-wavelength phase delay characteristic and an optical axis formed in substantially the same direction as the retardation layer of the FR region was used as the retardation layer 22A of the right-eye region.

A PVA-based polarizer, which was a typical absorptive linear polarizer, was used as each of the first and second polarizers 12A and 12B of the display device 1 and the polarizers 21B and 22B of the polarizing glasses 2. Also, a TAC film serving as a polarizer protection film was disposed between the second polarizer 12B and the filter unit 13 in the display device 1 and between the polarizers 21B and 22B and the retardation layers 21A and 22A in the left-eye and right regions of the polarizing glasses 2. In this case, the TAC film had a thickness-wise retardation of about 60 nm, which was measured using a wavelength of about 550 nm, and a thickness of about 80 μm. Furthermore, an LC film obtained by forming an LC layer on a surface of a TAC film was used as each of the retardation layers of the filter unit and the retardation layers of the left-eye region and the right-eye region. In this case, the LC film had a thickness-wise retardation of about 60 nm, which was measured using a wavelength of about 550 nm, and a thickness of about 80 μm. The LC layer of the LC film of the filter unit was disposed toward the second polarizer 12B, and the LC film of each of the left-eye and right-eye regions was disposed toward the polarizers 21B and 22B.

(2) Measurement of Crosstalk Ratio 2-1. Measurement of Crosstalk Ratio Relative to Inclination Angle When observing through a display device and polarizing glasses in a diagonal direction, a crosstalk ratio was measured while varying only a inclination angle. A variation in crosstalk ratio relative to a inclination angle was illustrated with a dotted line in FIG. 11.

2-2. Measurement of Crosstalk Ratio Relative to Azimuthal Angle

When a display device was disposed at a inclination angle of about 50° with polarizing glasses, crosstalk ratios of the display device and the polarizing glasses were measured while varying an azimuthal angle. A variation in crosstalk ratio relative to an azimuthal angle is illustrated with a dotted line in FIG. 13.

Figure 16:
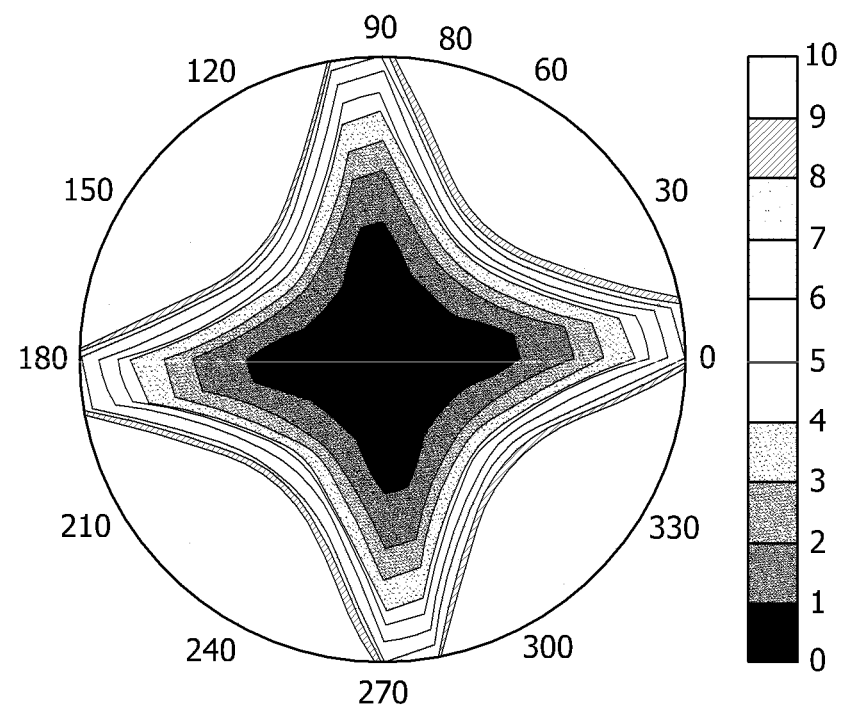

2-3. Measurement of Crosstalk Ratio Relative to Inclination Angle and Azimuthal Angle Crosstalk ratios were measured while changing a inclination angle formed by a display device with polarizing glasses from about 0° to about 80° and changing an azimuthal angle from about 0° to about 360°. A variation in crosstalk ratio relative to a inclination angle and azimuthal angle is shown in FIG. 16. FIG. 16 is a graph in which the same range of crosstalk ratio is denoted by the same color. That is, a crosstalk ranging from about 0% to about 1% is denoted by blue, and a crosstalk ranging from about 9% to about 10% is denoted by red. As a crosstalk ratio increases, bluish color may gradually change into reddish color. In FIG. 16, the crosstalk ranging from about 0% to about 1% may correspond to a line graph "0", and the crosstalk ranging from about 9% to about 10% may correspond to a line graph "10". Thus, as a number indicated by a line graph increases, a crosstalk ratio may also increase. Accordingly, it can be seen that although the center of the graph of FIG. 16 has a crosstalk ratio of about 0% to 1%, a crosstalk ratio increases toward an outer edge of the graph of FIG. 16.

Examples 2 Through 5 and Comparative Examples 1 Through 5

(1) Manufacture of Display Device and Polarizing Glasses

A display device and polarizing glasses were manufactured in the same manner as in Example 1 except that properties of a polarizer protection film of the display device, a base layer of an LC film used as a retardation layer of a filter unit, a polarizer protection film of the polarizing glasses, and a retardation layer of the polarizing glasses were changed as shown in Table 1 in Example 1. Also, in Examples 2 through 5, retardation layers of first and second regions of the filter unit were controlled to have the same normal wavelength dispersion characteristics in which R(450)/R(550) was 1.18 and R(650)/R(550) was 0.92. The retardation layers of the right-eye and left-eye regions of the polarizing glasses were controlled to have normal wavelength dispersion characteristics in which R(450)/R(550) was 1.18 and R(650)/R(550) was 0.92.

TABLE 1

| | | Polarizing glasses | | | | Display device | | | | |
|---|---|---|---|---|---|---|---|---|---|---|
| | | Retrdation layers of left-eye and right-eye regions | | | | Retardation layer of filter unit | | | | |
| | | Delay[1] | Property[1] | Type[1] | Base[1] | Protection film[1] | Delay[2] | Property[2] | Type[2] | Base[2] | Protection film[2] |
| Example | 1 | λ/4 | M | LC | T1 | T1 | λ/4 | P | LC | T1 | T1 |
| | 2 | λ/4 | M | LC | T1 | T1 | λ/4 | P | LC | T2 | T1 |
| | 3 | λ/4 | M | LC | T1 | T1 | λ/4 | P | LC | T2 | T2 |
| | 4 | λ/4 | M | LC | T1 | T2 | λ/4 | P | LC | T2 | T1 |
| | 5 | λ/4 | M | LC | T1 | T2 | λ/4 | P | LC | T2 | T2 |
| Comparative example | 1 | λ/4 | P | LC | T1 | T1 | λ/4 | P | LC | T1 | T1 |
| | 2 | λ/4 | P | LC | T1 | T1 | λ/4 | P | LC | T2 | T1 |
| | 3 | λ/4 | P | LC | T1 | T1 | λ/4 | P | LC | T2 | T2 |
| | 4 | λ/4 | P | LC | T1 | T2 | λ/4 | P | LC | T2 | T1 |
| | 5 | λ/4 | P | LC | T1 | T2 | λ/4 | P | LC | T2 | T2 |

Delay[1]: Phase delay characteristic of retardation layers of left-eye and right- eye regions of the polarizing glasses
Property[1]: Property of retardation layer of the left-eye and right-eye regions of the polarizing glasses
Type[1]: Type of the retardation layers of the left-eye and right-eye regions of the polarizing glasses
Base[1]: Base layer of an LC film when each of the retardation layers of the left-eye and right-eye regions of the polarizing glasses is the LC film
Protection film[1]: Polarizer protection film interposed between the polarizers and retardation layers in the left-eye and right-eye regions of the polarizing glasses
Delay[2]: Phase delay characteristic of retardation layers of the filter unit
Property[2]: Property of the retardation layers of the filter unit
Type[2]: Type of the retardation layers of the filter unit
Base[2]: Base layer of an LC film when each of the retardation layers of the filter unit is the LC film
Protection film 2: Polarized protection film interposed between the filter unit and the second polarizer
M: Negative uniaxial retardation film
P: Positive uniaxial retardation film
T1: TAC film with a thickness-wise retardation of about 60 nm
T2: TAC film with a thickness-wise retardation of about 0 nm
LC: LC film (2) Measurement of Crosstalk Ratio Crosstalk ratios of the display devices and the polarizing glasses relative to an azimuthal angle and/or inclination angle were measured in the same manner as in Example 1 except that the display devices and the polarizing glasses manufactured in Examples 2 through 5 and Comparative examples 1 through 5 were used. Results of crosstalk ratios of the display device and the polarizing glasses according to each of Examples and Comparative examples relative to the azimuthal angle and/or inclination angle are shown in FIGS. 11 through 24. Results of comparisons among Examples and Comparative examples may be confirmed via Table 2.

TABLE 2

Figure 11:
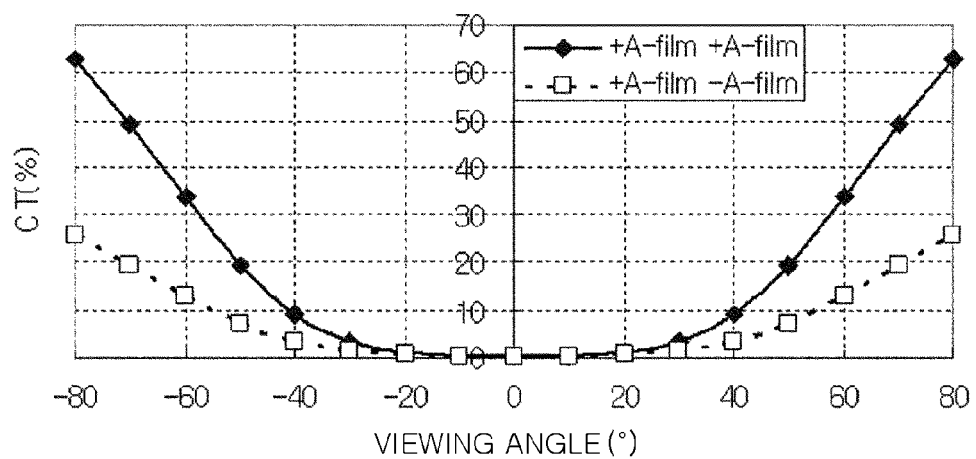
FIGS. 11 through 24 are graphs showing a crosstalk ratio relative to an azimuthal angle and/or inclination angle in display devices and polarizing glasses according to Embodiments 1 through 5 and Comparative examples 5.
Figure 12:
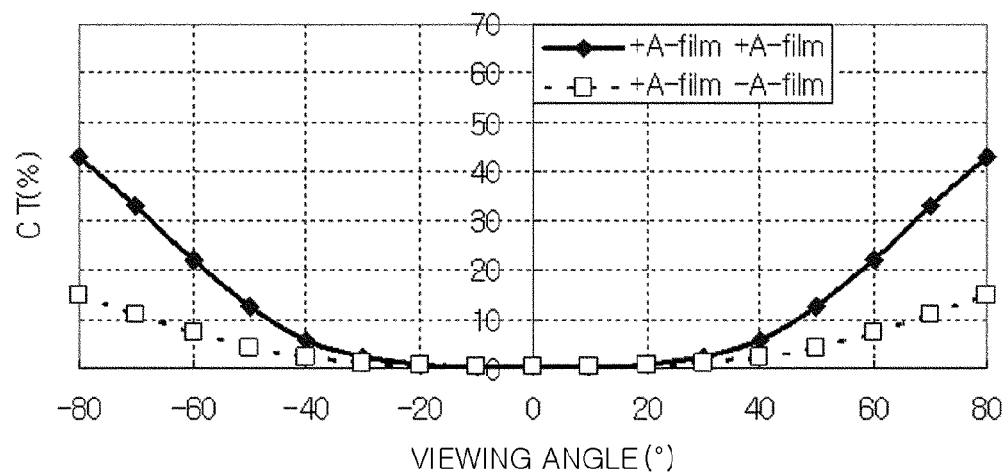
Figure 13:
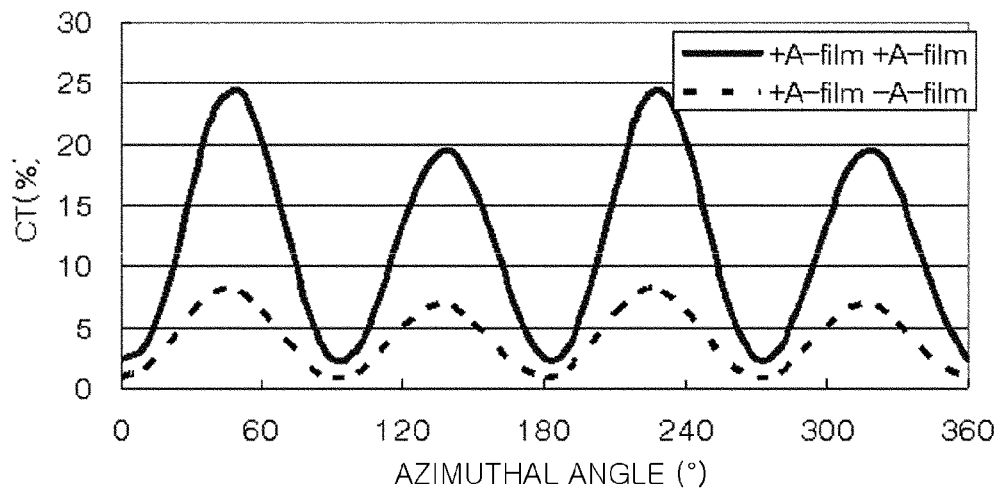
Figure 14:
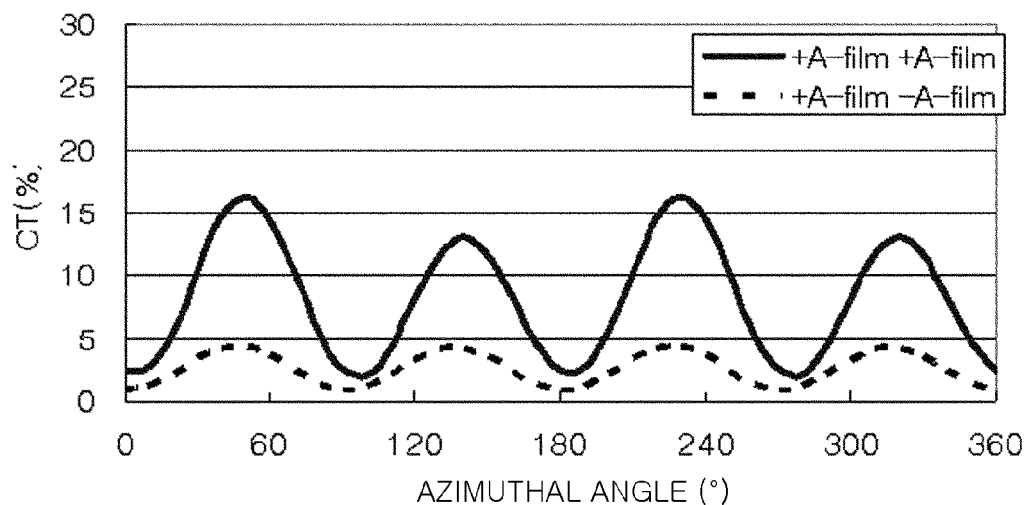
Figure 15:
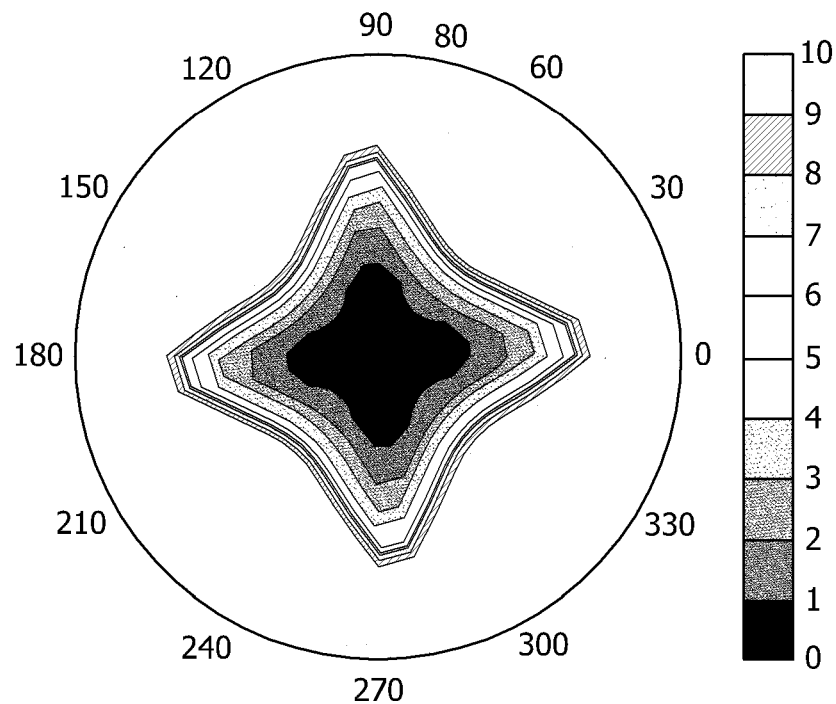
Figure 17:
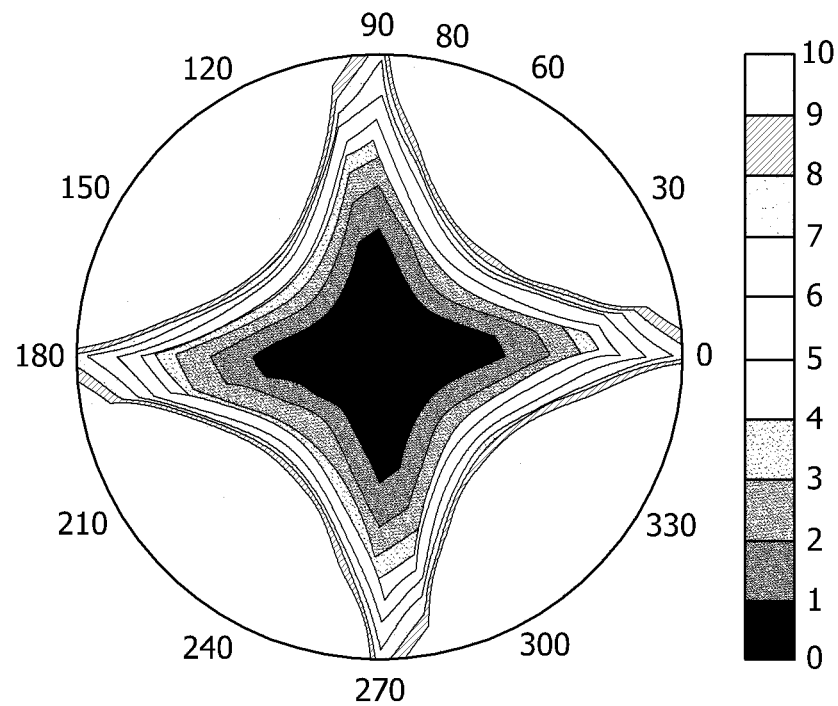
Figure 18:
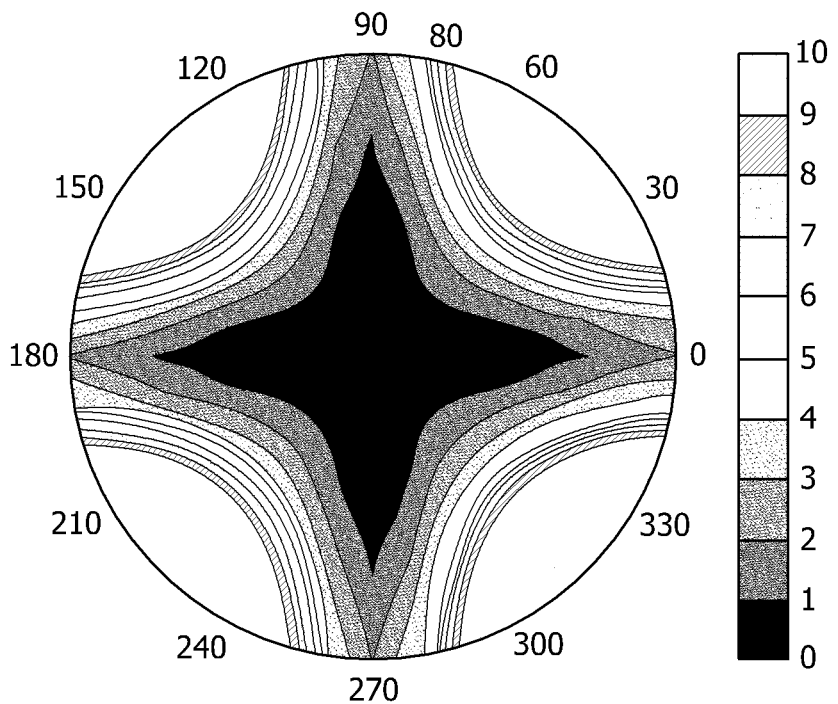
Figure 19:
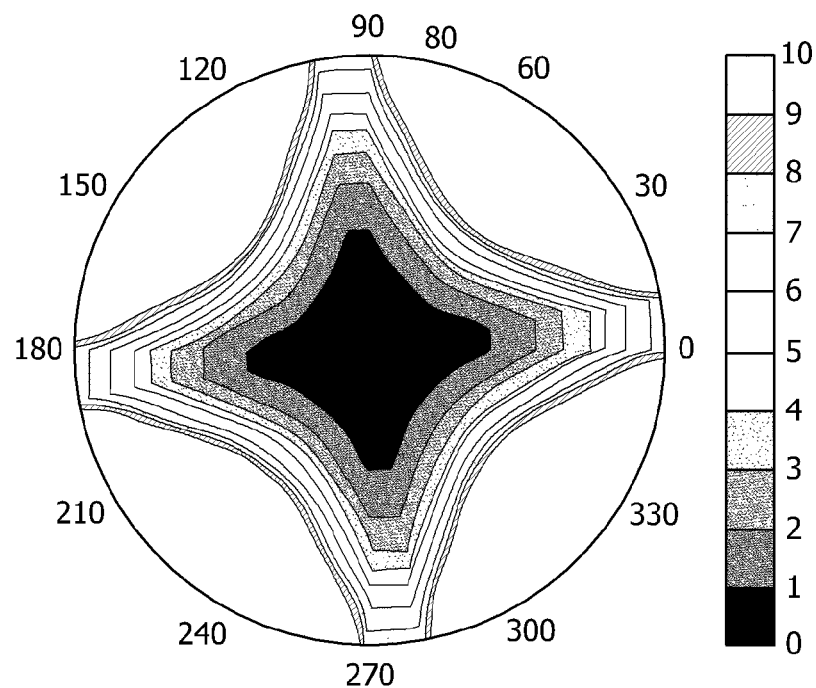
Figure 20:
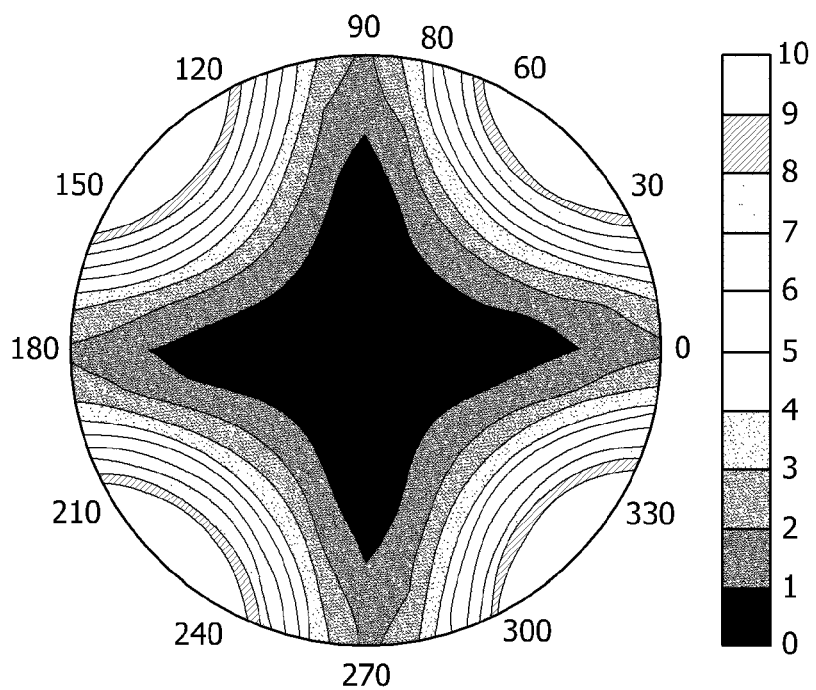
Figure 21:
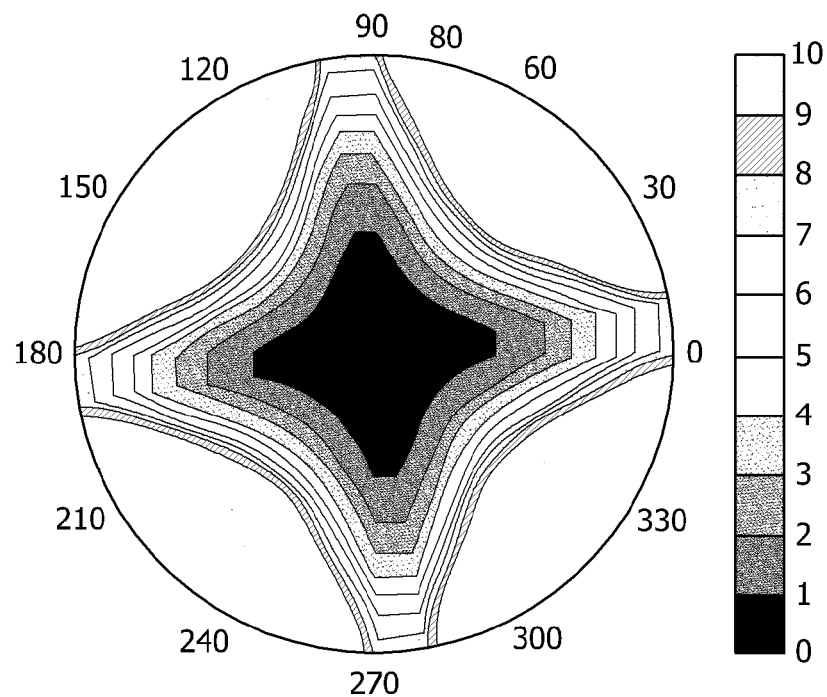
Figure 22:
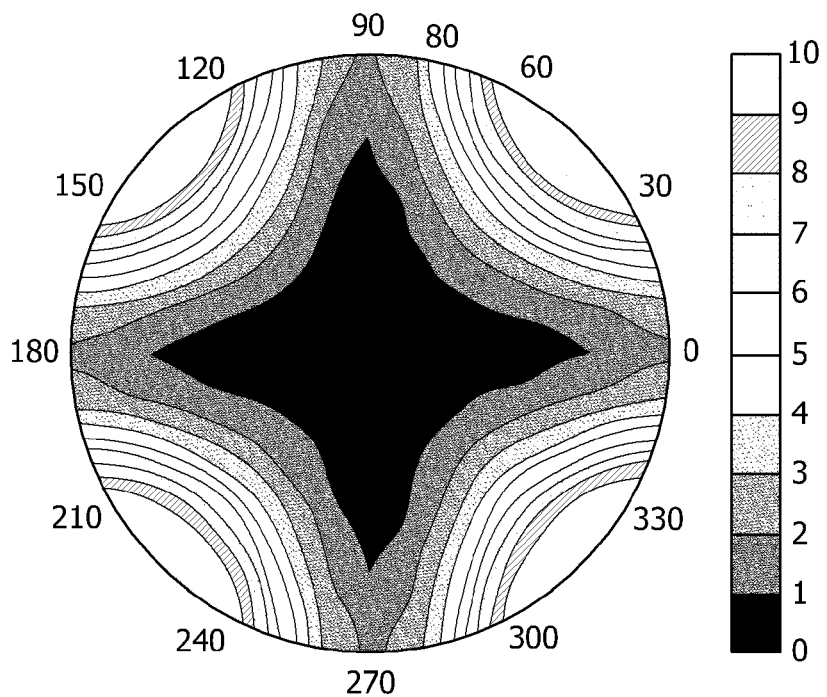
Figure 23:
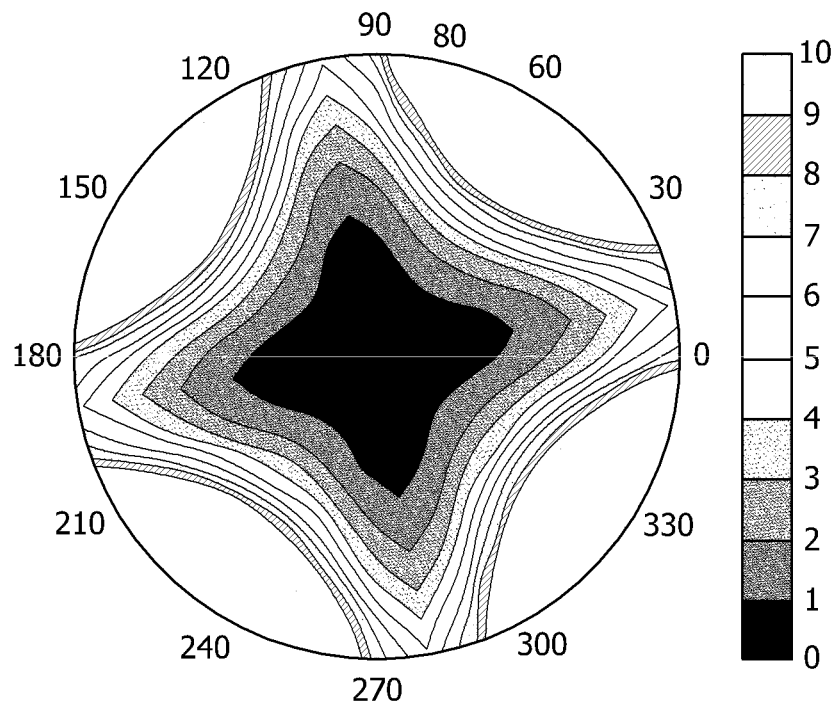
Figure 24:
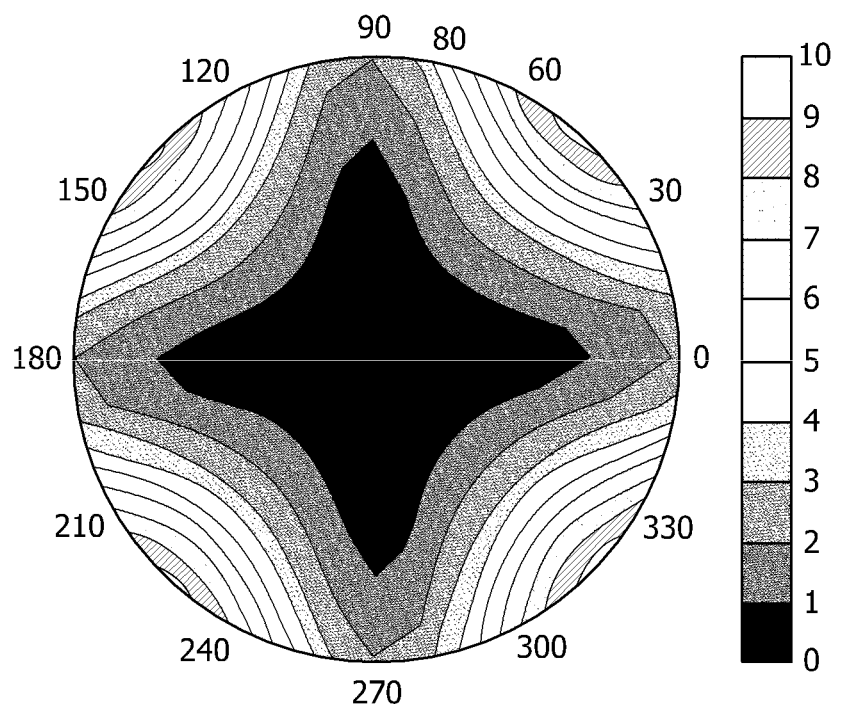

| | | Variation in crosstalk relative to inclination angle | Variation in crosstalk ratio relative to azimuthal angle | Variation in crosstalk ratio relative to inclination angle and azimuthal angle |
|---|---|---|---|---|
| Example | 1 | Dotted line of FIG. 11 | Dotted line of FIG. 13 | FIG. 16 |
| | 2 | Dotted line of FIG. 12 | Dotted line of FIG. 14 | FIG. 18 |
| | 3 | — | — | FIG. 20 |
| | 4 | — | — | FIG. 22 |
| | 5 | — | — | FIG. 24 |
| Comparative Example | 1 | Solid line of FIG. 11 | Solid line of FIG. 13 | FIG. 15 |
| | 2 | Solid line of FIG. 12 | Solid line of FIG. 14 | FIG. 17 |
| | 3 | — | — | FIG. 19 |
| | 4 | — | — | FIG. 21 |
| | 5 | — | — | FIG. 23 |

What is claimed is:

1. A display device for emitting a stereoscopic image with widened viewing angles at the upper and lower, and left and right edges thereof when viewed with polarizing glasses comprising a left-eye region and a right-eye region, each of which comprises a uniaxial retardation layer and a polarizer, the display device comprising:
    a display unit configured to generate a left-eye image signal and a right-eye image signal; and
    a filter unit comprising a first region and a second region respectively having retardation layers to differently control polarization states of the left-eye image signal and the right-eye image signal generated by the display unit, wherein the retardation layers of the first and second regions of the filter unit have uniaxiality with an opposite sign to the uniaxial retardation layer of the polarizing glasses, and the retardation layers of the first and second regions of the filter unit have the same wavelength dispersion characteristics, wherein the first and second regions are alternately formed adjacent to one another in stripe shapes or are alternately disposed adjacent to one another to form a grid pattern, wherein the uniaxial retardation layer is either a positive or negative uniaxial retardation layer, and wherein the positive uniaxial retardation layer satisfies Equation 1 and the negative uniaxial retardation layer satisfies Equation 2 to provide the widened viewing angles:

$$n_{max} > n_{min} = n_z \quad (1)$$

$$n_{max} = n_z > n_{min} \quad (2)$$

wherein $n_{max}$, $n_{min}$ and $n_z$ refer to an x-axial refractive index, an y-axial refractive index and a z-axial refractive index of a retardation layer respectfully, the x-axis refers to any one direction on a surface of the retardation layer, the y-axis refer to an in-plane direction vertical to the x-axis and the z-axis refers to a direction normal to a plane surface formed by the x-axis and the y-axis, wherein the retardation layers of the first and second regions have an in-plane retardation satisfying Equation 3 to provide the widened viewing angles:

$$R(\lambda) = d \times (n_e - n_o) \quad (3)$$

wherein $R(\lambda)$ is an in-plane retardation, d is the thickness of the retardation layer, $n_e$ is an extraordinary refractive index, and $n_o$ is an ordinary refractive index, and wherein $n_e$ refers to a different refractive index obtained in one direction out of $n_{max}$, $n_{min}$, and $n_z$, and $n_o$ refers to the same refractive index obtained in two directions out of $n_{max}$, $n_{min}$, and $n_z$.

2. The display device of claim 1, wherein one of the left-eye image signal and the right-eye image signal respectively passed through the first and second regions is a left-circularly polarized signal, and the other is a right-circularly polarized signal.

3. The display device of claim 1, wherein the retardation layers of the first and second regions have optical axes formed in different directions.

4. The display device of claim 1, wherein each of the retardation layers of the filter unit is a positive uniaxial retardation layer, and each of the retardation layers of the polarizing glasses is a negative uniaxial retardation layer.

5. The display device of claim 1, wherein each of the retardation layers of the filter unit is a negative uniaxial retardation layer, and each of the retardation layers of the polarizing glasses is a positive uniaxial retardation layer.

6. The display device of claim 1, wherein both the retardation layers of the first and second regions of the filter unit have normal wavelength dispersion characteristics, flat wavelength dispersion characteristics, or reverse wavelength dispersion characteristics.

7. The display device of claim 1, wherein both the uniaxial retardation layers of the right-eye region and left-eye region of the polarizing glasses have normal wavelength dispersion characteristics, flat wavelength dispersion characteristics, or reverse wavelength dispersion characteristics.

8. The display device of claim 7, wherein the retardation layers of the right-eye region and the left-eye region have the same wavelength dispersion characteristics as the retardation layers of the filter unit or different wavelength dispersion characteristics from the retardation layers of the filter unit.

9. The display device of claim 7, wherein the retardation layers of the right-eye region and the left-eye region have the same wavelength dispersion characteristics.

10. The display device of claim 1, wherein each of the retardation layers of the filter unit comprises a base layer and a liquid crystal layer formed on a surface of the base layer and comprising an aligned rod-shaped liquid crystal compound, an aligned discotic liquid crystal compound, or an cholesteric liquid crystal compound.

11. The display device of claim 10, wherein an absolute value of a thickness-wise retardation of the base layer is about 100 nm or less.

12. The display device of claim 1, wherein each of the retardation layers of the filter unit is an optical anisotropic polymer film.

13. The display device of claim 1, further comprising the polarizer interposed between the display unit and the filter unit.

14. The display device of claim 13, further comprising a polarizer protection film disposed on one side or both sides of the polarizer,
    wherein an absolute value of a thickness-wise retardation of the polarizer protection film is about 100 nm or less.

15. The display device of claim 13, wherein the first region of the filter unit has an optical axis configured to form an angle of about 30° to about 70° with an absorption axis of the polarizer clockwise, and the second region of the filter unit has an optical axis configured to form an angle of about 30° to about 70° with the absorption axis of the polarizer counterclockwise.

16. The display device of claim 13, wherein an absorption axis of the polarizer of the left-eye region is formed parallel to an absorption axis of the polarizer of the right-eye region, and
    the absorption axes of the polarizers formed to be parallel to each other are perpendicular to an absorption axis of the first polarizing plate under the state where the polarizing glasses are positioned so as for an imaginary line connecting centers of the right-eye region and the left-eye region to be perpendicular or parallel to a boundary line between the first and second regions of the display device.

17. The display device of claim 1, wherein when an imaginary line connecting the center of the left-eye region and the center of the right-eye region is disposed at perpendicular or parallel to a boundary line between the first and second regions of the display device, an optical axis of the retardation layer of the first region and an optical axis of the retardation layer of the left-eye region are formed in the same direction, and an optical axis of the retardation layer of the second region and an optical axis of the retardation layer of the right-eye region are formed in the same direction.

18. Polarizing glasses for observing a stereoscopic image emitted from a display device comprising a display unit configured to generate widened viewing angles at the upper and lower, and left and right edges thereof for a left-eye image signal and a right-eye image signal, a filter unit comprising a first region and a second region respectively having uniaxial retardation layers to differently control polarization states of a left-eye image signal and a right-eye image signal generated by the display unit, and a polarizer interposed between the display unit and the filter unit, wherein the uniaxial retardation layers of the first and second regions of the filter unit have the same wavelength dispersion characteristics, the polarizing glasses comprising a left-eye region and a right-eye region, wherein each of the left-eye region and the right-eye region respectively comprises a polarizer and a uniaxial retardation layer with the opposite sign to the uniaxial retardation layers of the first and second regions of the filter unit, wherein the first and second regions are alternately formed adjacent to one another in stripe shapes or are alternately disposed adjacent to one another to form a grid pattern, and wherein the uniaxial retardation layer is either a positive or negative uniaxial retardation layer, and wherein the positive uniaxial retardation layer satisfies Equation 1 and the negative uniaxial retardation layer satisfies Equation 2 to provide the widened viewing angles:

$$n\max > n\min = nz \quad (1)$$

$$n\max = nz > n\min \quad (2)$$

wherein nmax, nmin and nz refer to an x-axial refractive index, an y-axial refractive index and a z-axial refractive index of a retardation layer respectfully, the x-axis refers to any one direction on a surface of the retardation layer, the y-axis refer to an in-plane direction vertical to the x-axis and the z-axis refers to a direction normal to a plane surface formed by the x-axis and the y-axis.

19. The polarizing glasses of claim 18, wherein wavelength dispersion characteristics of the uniaxial retardation layers of the right-eye region and the left-eye region are the same as or different from the wavelength dispersion characteristics of the uniaxial retardation layers of the first and second regions of the filter unit.

20. The polarizing glasses of claim 18, wherein the uniaxial retardation layers of the right-eye region and the left-eye region have the same wavelength dispersion characteristics.

21. The polarizing glasses of claim 18, wherein an absorption axis of the polarizer of the left-eye region is formed parallel to an absorption axis of the polarizer of the right-eye region, and the absorption axes of the polarizers formed to be parallel to each other are perpendicular to an absorption axis of the first polarizing plate under the state where the polarizing glasses are positioned so as for an imaginary line connecting centers of the right-eye region and the left-eye region to be perpendicular or parallel to a boundary line between the first and second regions of the display device.

* * * * *